Figure 1:
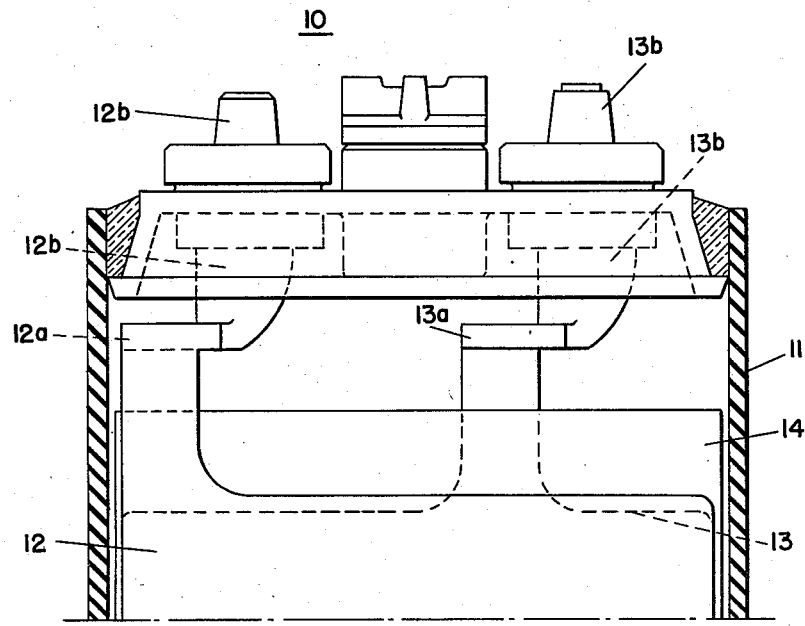

May 11, 1954   H. STOERTZ   2,678,341
STORAGE BATTERY AND GRID THEREFOR
Original Filed Nov. 22, 1950

*INVENTOR.*
HOWARD STOERTZ
BY
ATTORNEY

Patented May 11, 1954

2,678,341

UNITED STATES PATENT OFFICE 2,678,341

STORAGE BATTERY AND GRID THEREFOR

Howard Stoertz, Philadelphia, Pa., assignor to The Electric Storage Battery Company, a corporation of New Jersey Substituted for abandoned application Serial No. 197,128, November 22, 1950. This application November 5, 1953, Serial No. 390,469

20 Claims. (Cl. 136—65)

This invention relates to improvements in storage batteries of the lead-acid type, and particularly to the grid composition of the positive plates of such batteries and of the posts and straps connected to said positive plates, which composition has the characteristic of not only increasing the life of the plates but also reducing local action in the negative plates.

This application is filed in substitution for my application Serial No. 197,128, filed November 22, 1950, now abandoned, which is a continuation-in-part of my earlier filed application Serial No. 713,104, filed November 29, 1946, now abandoned, for Storage Batteries and Grids Therefor.

It is an object of the present invention to provide improved storage batteries in which the positive grids, their straps, and their associated posts are rendered less susceptible to electrochemical attack, thereby increasing the life of the battery.

Storage battery grids of the type used in lead-acid batteries are commonly formed of lead-antimony alloys containing from 6% to 12.5% antimony, with tin from around 0.15% to about 0.5%, along with minor amounts of other metals present as impurities. When such storage batteries are charged, it is common practice to leave them "on the line" for a period somewhat longer than necessary to bring them up to a maximum or fully charged condition. During overcharge, the material of the positive grids is particularly subject to electrochemical attack. A part of the antimony is removed from the positive grids and their associated straps and posts and is deposited on the negative plates. This action occurs as the result of electrochemical attack resulting in oxidation of antimony and possibly of other metals (copper or nickel) present in the positive grids and associated structure. The oxides so formed dissolve in the electrolyte to form salts, some of which decompose at the negative plates with deposition on them of metallic antimony in a particularly active form.

Local action takes place between the metals so deposited on the negative plates and the active material of such plates to their detriment. The local action, which may also affect the negative straps and posts, is one of the causes of ultimate failure of batteries of the lead-acid type, the foregoing phenomena being particularly deleterious by greatly shortening the life of batteries so constructed and designed to have an especially long life and suitable for service as "floating" or "standby" batteries.

While it has heretofore been known that the electrochemical attack of the positive grids with deposition of antimony on the negative plates can be reduced by refining the grain structure of the grid alloy, much has been left to be desired in producing grids of alloys which are not the major cause, or a major contributing cause, of ultimate failure of the battery. In the past it has been proposed that the grain structure of grid alloys may be refined, that is, the grain size reduced, by physical treatment. For example, rapid cooling or quenching of the grid castings in the molds has been described as helpful. However, in gravity casting of the grids, the molds must be heated in order for the metal to remain fluid to fill the mold cavity. Rapid cooling in the molds has, therefore, not been practical. If such grids are later heat-treated and quenched, they are made more costly due to the additional operations which are not easy of accomplishment since the lead-antimony alloys must be heated uniformly to very near the melting point in order to obtain the desired recrystallization. If the heating is carried out in oil baths to obtain the required uniformity, the additional step must be added of completely removing the oil from the grid surfaces before application of the active material, generally lead oxide.

Prior to the present invention it has been known that lead-antimony alloys of high antimony content have a finer grain structure than those of lower antimony content. However, as the antimony content is increased, greater amounts of antimony are deposited on the negative plates. Therefore, the advantage of the reduced grain size is more than offset by the greater deposition of antimony on the negative plates with consequent increased local action.

In accordance with the present invention it has been found that the electrochemical attack of the positive grids including their associated structure formed of a lead-antimony alloy can be greatly reduced by adding to the alloy in suitable proportion the material, arsenic, as an alloying ingredient. The lead-arsenic-antimony alloys of the present invention are less susceptible to anodic attack than can be explained on the basis of mere reduction in grain size. While the additive, arsenic, refines the grain structure, it appears also to impart additional inhibition or immunity to anodic attack irrespective of grain size, that is to say, anode structures of alloys of the present invention are much more resistant to anodic attack than lead-antimony-alloys of comparable grain size heretofore used.

Further in accordance with the invention, the anodic structure may be produced without special physical treatment, the improved characteristics being attained by use of arsenic in suitable proportion as an alloying ingredient with lead and antimony.

While it is common for arsenic to be present in lead-antimony alloys as an impurity, it has been considered an undesirable impurity. For example, Vinal states: "Arsenic is the principal impurity that is associated with antimony and deleterious to storage batteries." (Vinal, "Storage Batteries," 3rd edition, 1940, page 14, published by John Wiley and Sons, Inc., New York, N. Y.) Accordingly, it has been common practice to specify that the arsenic content of storage battery alloys shall be kept to a minimum, less than 0.10% and generally 0.05% maximum.

Figure 2:
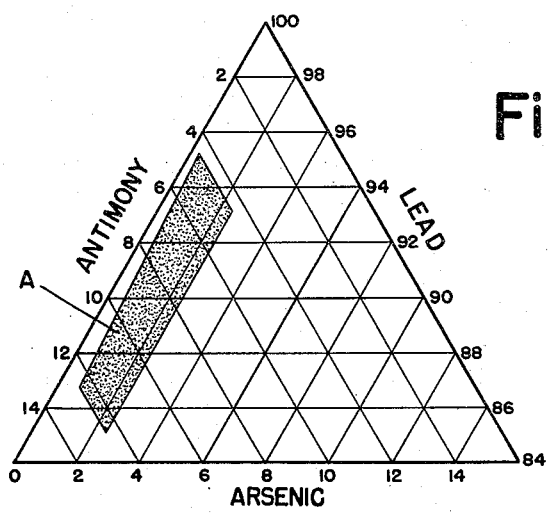

For a more detailed description of the invention and for further objects and advantages thereof, reference is to be had to the following description taken in conjunction with the accompanying drawing in which there has been shown in Fig. 1 a fractional sectional view of a typical lead-acid storage battery to which the invention has been applied, and Fig. 2 is a diagram illustrating the preferred compositions of the alloy of the present invention.

Referring to the drawing, a fractional part of a storage battery 10 has been illustrated comprising the usual insulating container 11 with a series of negative plates 12 secured together by a strap 12a from which there extends through the cover of container 11 a post 12b. A series of positive plates 13 alternate with the negative plates 12, separators 14 being respectively interposed between each adjacent positive and negative plate. The anodic structure comprising the positive plates 13, their strap 13a and associated post 13b is, of course, to substantial degree immersed within the electrolyte, generally sulphuric acid, the optimum level of electrolyte being just above the upper edges of the separators 14. Thus, it will be seen that in mobile applications the straps and posts of each cell of the storage battery will be subject to the anodic electrochemical attack above described, with resultant deposition of antimony on the negative plates unless there be utilized alloys made in accordance with the teachings of the present invention.

The straps and posts of stationary batteries will also be subject to attack due to droplets of electrolyte carried to them as a result of evolution of gas within the cell and/or the creepage of the electrolyte upon portions of the anodic structure exposed thereto.

In accordance with the present invention, I have found that by making the anodic structure as a whole, particularly the grids and other portions exposed to the electrolyte, of a lead-arsenic-antimony alloy, there is materially greater resistance to anodic attack, the enhancement of this property resulting in a substantially longer life of the battery.

In accordance with the present invention, the anodic structure including the grids and their associated straps and posts may comprise alloys within the following range:

| Antimony | Arsenic | Lead |
|---|---|---|
| From about 4.5% to about 12.5%. (preferably in proportions such that 54 times the weight percent of arsenic is at least equal to 3.9 times the weight percent of antimony.) | From about 0.2% to about 2.5%. | The remainder, except for a small amount of added metals heretofore used, such as tin (0.15% to about 0.5%) and minor impurities. |

The additive, arsenic, in the above-stated range refines the grain structure to a noticeable extent, but this refinement only partially accounts for the increased resistance to anodic attack. Alloys containing antimony in the upper portions of the above range, but with arsenic below the above-specified range, have fine or small grain structure but are much more susceptible to anodic attack. On the other hand, alloys containing antimony in the lower portion of said range, and arsenic anywhere in the range, have somewhat coarser grain structure than the high antimony alloys. Nevertheless, they are more resistant to anodic attack. The novel characteristics resulting from the use of arsenic within the above-stated range are obtained without special physical treatment such as heat-treating and quenching and without the addition of alloying ingredients other than a small amount of tin (0.15% to about 0.5%) added to promote fluidity in casting. However, the present invention is not to be limited to alloys in which no physical treatment is performed, nor to alloys in which no other ingredients are present, since the beneficial properties imparted by arsenic to the ternary alloy here disclosed are not necessarily lost by such physical treatment or by addition of said other materials. It is again emphasized that the present invention includes ternary alloys containing the usual impurities found in commercial lead and in commercial lead alloys, and it also includes alloys within the above-described range containing small amounts of other materials of the type heretofore added to battery alloys for well-known reasons.

As a result of a series of tests of lead-arsenic-antimony alloys in which antimony was varied over a wide range and in which arsenic was varied over a wide range, the limits set forth in the above table have been established as characterizing the present invention. It was found that as the arsenic content of the ternary alloy is reduced for any given percentage of antimony within the aforesaid range, the electrochemical attack on the anodic structure rapidly increases. As the arsenic content of the ternary alloy is increased, as for example from about 0.25% to about 1.25% with 6% antimony, the anodic attack or corrosion-susceptibility is rapidly decreased in terms of increased battery life under the conditions of the tests. Accordingly, from the tests with the 6% antimony alloys and with 12% antimony alloys, and from similar results with other proportions, the present invention encompasses the range of arsenic with antimony, up to a maximum of arsenic corresponding with the eutectic point of arsenic in lead, namely, about 2.5%.

Ternary alloys within the scope of the invention containing about 6% antimony are relatively difficult to use in the commercial production of positive plates with automatic machinery. The difficulty increases as the antimony decreases. At the present time it appears impractical commercially to produce with automatic machinery positive plates and their associated structures with antimony in such low percentage as about 4% for the reason that even with 6% antimony the reject rate, that is the positive grids not fit for use in batteries, sometimes runs as high as 50%. Improved casting techniques have made possible machine production of low antimony (6%), relatively high arsenic-lead, alloy grids on a commercial basis even though the percentage of rejects are still of an undesirably high order (about 20%). Because of the extended life of the batteries due to the improved characteristics of the alloy as regards the liberation of antimony and the deposition thereof on the active material of the negative plates, the commercial advantages thus secured more than offset the production costs due to the high reject rate.

For ternary alloys with about 6% antimony, it is preferred that the arsenic be present in amounts ranging from about 0.45% to 1.25%.

Specific examples which illustrate the improvement in battery life brought about by use of positive grids formed in accordance with the present invention are as follows:

An early example

The first example involves the comparison of battery life between two batteries, one having a composition of the anodic structure outside the scope of the invention and the other within the scope of the invention. These batteries were of the long-life floating type, which in use are not subject to alternate cycles of charge and discharge. The antimony and arsenic contents of the positive grid alloys of these batteries were as follows:

|  | Weight Percent Antimony | Weight Percent Arsenic |
|---|---|---|
| (Battery "A") | 12.0 | 0.03 |
| (Battery "B") | 9.0 | 0.2 |

Battery "A" showed a life of only seven years. Battery "B," having positive grids in accordance with the present invention, had a life of seventeen years.

Certain conclusions may be drawn as a result of a further extensive series of overcharge tests which have already been referred to. These tests were conducted under the following conditions:

Charge at 8.3 amperes for 98 hours. Stand on open circuit for 65½ hours. Discharge at 15.2 amperes for a minimum of 3½ hours to a final voltage of 5.1 volts. Stand on open circuit for 1 hour and then repeat.

When a battery failed either to deliver a discharge current of 15.2 amperes for the full 3½ hour period, or at the end of the 3½ hour period the final voltage was less than 5.1 volts, it was known that the battery had reached the end of its useful life. Subsequent inspection of such batteries confirmed the criteria of the tests. Corrosion of the anodic structure, particularly the grids, had progressed to a point where active material from the positive grids was found at the bottom of the battery case. Some of the ribs in the grids were broken with a resulting increase in the internal resistance of the battery due to the lower conductivity of the grids. The negative plates of the batteries used in the tests were, in general, in reasonably good condition, not having attained the end of their useful lives.

The completion of each charge and discharge of the battery requires about one week. Such a charging and discharging cycle has been arbitrarily assumed to be the equivalent of five life cycles. The life cycles, though arbitrary units, do represent a reliable measure of battery performance. The results could also be expressed in weeks, each five life cycles corresponding to one week.

The formula set forth in my parent application, Serial No. 197,128, was developed through the application of statistical methods utilizing the then available test data. As is well understood by those familiar with that type of analysis, the rationalization of test data is frequently expressed by a standard error of estimate. The previous calculations indicated the standard error of estimate to be 15 cycles, and the equation as a whole appeared as follows:

(1)
Life cycles=119 minus 3.9 times antimony in weight percent plus 54 times arsenic in weight percent.

The above formula or equation demonstrates that antimony is a negative factor representing corrosion-susceptibility while arsenic is a positive factor exhibiting a corrosion-inhibiting effect offsetting said corrosion-susceptibility. Accordingly, antimony will be selected in as small a percentage as may be tolerated in view of practical considerations imposed as necessary to commercial production of battery grids. Stated differently, longer battery life than heretofore realized is obtained with arsenic present above about 0.2% by weight within the lower percentages of antimony as from about 4.5% to 6.5%. The corrosion-inhibiting effect of arsenic is proportionately greater for the lower range of antimony alloys.

Because the positive arsenical factor has an unexpectedly high value, wholly disproportionate to the percentage factor it represents in the alloy, small changes in the amount of arsenic present in a given lead-antimony alloy greatly increase battery life.

The foregoing formula or equation represents a correlation and evaluation of the data upon which it is based to within a standard error of estimate of plus or minus 15 cycles. In reviewing the calculations from which the foregoing equation was derived, an arithmetical error was found which was not revealed in the check mechanism because it was self-compensating. In view of the accuracy of the equation itself the arithmetical error could be considered negligible. However, I prefer to use the corrected equation which reads as follows:

(2)
Life cycles=118 minus 3.8 times antimony in weight percent plus 56.8 times arsenic in weight percent.

The standard error of estimate for the foregoing equation is plus or minus 14 cycles, which, in view of the experimental data recorded in multiples of five, may be taken as 15 cycles.

Uncontrollable variables are always present in accumulating a mass of experimental test data. In battery testing, variations in separator quality, porosity and thickness, the nature of the active material and the amount thereof, together with the precision of measurement of all factors represent variables in the test data forming the basis for Equation 2.

The standard error of estimate represents a measure of the extent to which the experimental data falls within its limits. A correlation coefficient provides a measure of the degree to which the derived equation may be utilized as relating the behavior of a dependent variable with change in values of independent variables. That coefficient is considered high; for Equation 2 it is equal to 0.88 out of a possible 1.00, the latter representing perfect correlation.

It is again emphasized that Fig. 2 of the drawing discloses the range of arsenic, antimony, and lead in storage battery grids made in accordance with the present invention, arsenic ranging from about 0.2% to about 2.5% by weight, and antimony ranging from about 4.5% to about 12.5% with the remainder lead. The formula or equation indicates how preferred values of arsenic may be selected for a given percentage of antimony.

There will now be presented a few examples based on the equations, followed by typical selected test data upon which the formula is based:

*Examples based upon the formula*

| Wt. Percent Antimony | Wt. Percent Arsenic | Life Cycles | |
|---|---|---|---|
| | | Equation No. 1 | Equation No. 2 |
| 5 | .75 | 140 | 142 |
| 6 | 0.9 | 144 | 146 |
| 7 | 1.25 | 159 | 162 |
| *Antimony Constant* | | | |
| 6 | .75 | 136 | 138 |
| 6 | 0.9 | 144 | 146 |
| 6 | 1.25 | 163 | 166 |
| *Arsenic Constant* | | | |
| 5 | 0.9 | 148 | 150 |
| 6 | 0.9 | 144 | 146 |
| 7 | 0.9 | 140 | 143 |

Typical test data upon which the formula is based are as follows:

| Antimony | Arsenic | Life Cycles | | |
|---|---|---|---|---|
| | | Actual | Formula | |
| | | | #1 | #2 |
| 6 | 0.9 | 145 | 144 | 146 |
| 6 | 1.25 | 157.5 | 163 | 166 |
| 9 | .75 | 120 | 125 | 126.4 |
| 12 | 1.25 | 137.5 | 140 | 143.4 |

If the arsenic factor from the above formulae (at least 54 times arsenic in weight percent) is equal to the antimony factor (about 3.9 times antimony in weight percent), the life cycles which may be expected under the conditions of the overcharge tests will be 119, to an accuracy within one standard error of estimate of plus or minus 15 cycles. If a deviation of 15 cycles in the direction of decreased life be taken (119—15), a life of 104 cycles will be indicated. That decrease is equivalent to a reduction in arsenic content of about 0.25%. Stated differently, the above formula applies to within the one standard error of estimate of plus or minus fifteen life cycles. Thus, the formula applies if in its use there be added to the weight percent arsenic, 0.25% to take into account the experimental deviation in results, where the arsenic factor is then at least equal to the antimony factor. Life cycles as high as 159 were obtained in the tests, one battery being shown in the table for 157.5 life cycles. In general, it is preferred that arsenic be included in the alloy in quantity such that the arsenic factor shall exceed the antimony factor by about 20. In a substantial number of the tests the arsenic factor exceeded by as much as 40 the antimony factor.

The range for the components of the alloy for battery grids within the scope of the present invention is shown by the distinctive area A of Fig. 2.

Data obtained as a result of the overcharge tests have confirmed conclusions drawn from earlier investigations and are not inconsistent with the greatly extended life, seventeen years, attained by battery "B" in the above example. The great improvement shown by battery "B" over battery "A" is attributed to the increase in arsenic from 0.03 weight percent to 0.2 weight percent. However, the data from the overcharge tests indicate that an alloy with a higher arsenic content than 0.2% will be preferred for batteries used under conditions where overcharging occurs, in contrast with stand-by duty.

In the claims I intend the terms "positive grids" and "anode structure" to refer to the latticed framework which carries the active material of the plates, and also in the generic sense to include the lug, the connecting strap, and that part of the terminal post exposed to the electrolyte. At least the grids, and preferably the anode structure as a whole will be made of the alloy specified in the appended claims. For positive grids of automobile batteries, if the antimony be selected between about 4.5% and 6.5% by weight, then arsenic should in accordance with the present invention be present in percentage between say from about 0.45% to 1.25% by weight. The percentage given in cycle-life decreases as arsenic increases above about 1.25%.

In summary, I have provided improved means for increasing the corrosion resistance of the positive plates and for reducing local action at the negative plates of lead-acid storage batteries. Both of these effects lead to marked improvement in the life of the battery. While I have disclosed preferred ranges of ingredients for illustrative storage battery applications, I do not wish to be limited to the examples set forth, but only by the scope of the appended claims.

What is claimed is:

1. A storage battery of the lead-acid type having positive and negative plates surrounded by electrolyte characterized by an anode structure comprising a lead-arsenic-antimony alloy, said alloy including antimony from about 4.5% to about 12.5% by weight, arsenic from about 0.2% to about 2.5% by weight, the presence of arsenic in the alloy representing a corrosion-inhibiting effect and the presence of antimony in the alloy within said range representing corrosion-susceptibility, the percentage by weight of arsenic within its said range decreasing said corrosion-susceptibility.

2. A storage battery of the lead-acid type having positive and negative plates surrounded by electrolyte characterized by an anode structure comprising a lead-arsenic-antimony alloy, said alloy including antimony from about 4.5% to about 6.5% by weight, arsenic from about 0.45% to about 1.25% by weight, the presence of arsenic in the alloy representing a corrosion-inhibiting effect and the presence of antimony in the alloy within its said range representing corrosion-susceptibility, the percentage by weight of arsenic within its said range offsetting said corrosion-susceptibility.

3. A storage battery of the lead-acid type having positive and negative plates surounded by electrolyte characterized by an anode structure comprising a lead-arsenic-antimony alloy, said alloy including antimony of about 6% by weight, arsenic from about 0.45% to about 1.25% by weight, the presence of arsenic in the alloy representing a corrosion-inhibiting effect and the presence of antimony in the alloy in said percentage representing corrosion-susceptibility, the percentage by weight of arsenic within its said range having a value such that its corrosion-inhibiting effect more than offsets said corrosion-susceptibility.

4. A storage battery of the lead-acid type having positive and negative plates surrounded by electrolyte, characterized by an anode structure comprising a ternary lead-arsenic-antimony alloy in which the factor of at least 54 times the sum of the percentage by weight of arsenic and 0.25% is not less than the factor of about 3.9 times the percentage by weight of antimony, with antimony within the range from about 4.5% to about 12.5%, arsenic within the range from 0.2% to about 2.5%, and lead the remainder.

5. A storage battery of the lead-acid type having positive and negative plates surrounded by electrolyte, characterized by an anode structure comprising a ternary lead-arsenic-antimony alloy in which the factor of at least 54 times the percentage by weight of arsenic is not less than the factor of about 3.9 times the percentage by weight of antimony, with antimony within the range from about 4.5% to about 12.5%, arsenic within the range from 0.2% to about 2.5%, and lead the remainder.

6. A storage battery of the lead-acid type having positive and negative plates surounded by electrolyte, characterized by an anode structure comprising a ternary lead-arsenic-antimony alloy in which the fatcor of at least 54 times the percentage by weight of arsenic is larger than the factor of about 3.9 times the percentage by weight of antimony, with antimony within the range from about 4.5% to about 12.5%, arsenic within the range from 0.2% to about 2.5%, and lead the remainder.

7. A storage battery of the lead-acid type having positive and negative plates surrounded by electrolyte, characterized by an anode structure comprising a ternary lead-arsenic-antimony alloy in which the factor of at least 54 times the percentage by weight of arsenic exceeds the factor of about 3.9 times the percentage by weight of antimony by an amount from 20 to 40, with antimony within the range from about 4.5% to about 12.5%, arsenic within the range from 0.2% to about 2.5%, and lead the remainder.

8. The improvement in storage batteries which consists of a positive grid consisting essentially of a lead-antimony-arsenic alloy, the arsenic being present within the range of from about 0.2% to 2.5% and the antimony being present in the range of from about 4.5% to 12.5%, the relationship between the amounts of arsenic and antimony present in the alloy within said ranges being such that at least 54 times the percentage by weight of arsenic will be greater than about 3.9 times the percentage by weight of antimony, whereby electrolytic corrosion of the positive grid is decreased and the cycle life of the battery is enhanced.

9. A storage battery of the lead-acid type having positive and negative plates surrounded by electrolyte, characterized by positive grids consisting essentially of a lead-arsenic-antimony alloy, said alloy including antimony from about 4.5% to about 12.5%, arsenic from about 0.2% to about 2.5%, and lead the remainder.

10. A storage battery of the lead-acid type having positive and negative plates surrounded by electrolyte, characterized by positive grids consisting essentially of a lead-arsenic-antimony alloy, said alloy including antimony from about 4.5% to about 6.5%, arsenic from about 0.45% to about 1.25%, and lead the remainder.

11. A storage battery of the lead-acid type having positive and negative plates surrounded by electrolyte, characterized by positive grids consisting essentially of a lead-arsenic-antimony alloy, said alloy including antimony from about 4.5% to about 6.5%, arsenic from about 0.45% to about 1.25%, and the remainder lead with tin in amount promoting fluidity in casting.

12. A storage battery of the lead-acid type having positive and negative plates surrounded by electrolyte, characterized by positive grids consisting essentially of a lead-arsenic-antimony alloy, said alloy including antimony from about 4.5% to about 6.5%, arsenic from about 0.45% to about 1.25%, and the remainder lead with tin in amount up to about 0.5% to promote fluidity in casting.

13. The method of decreasing corrosion of the positive grid of a storage battery and increasing the cycle life of the battery by supporting the active material on a grid consisting essentially of a lead-antimony-arsenic alloy, the arsenic being present within the range of from about 0.2% to 2.5%, and the antimony being present in the range of from about 4.5% to 12.5%, the remainder being lead.

14. The method of producing positive storage battery grids which are corrosion resistant and with increase in cycle life of the battery which comprises adding to lead, arsenic varrying from about 0.2% to 2.5%, antimony from about 4.5% to 12.5%, and machine-casting said alloy into grids.

15. The method of producing positive storage battery grids which are corrosion resistant and with increase in cycle life of the battery which comprises adding to lead, arsenic varying from about 0.45% to 1.25%, antimony from about 4.5% to 6.5%, and tin up to about 0.5% to increase fluidity of the resultant alloy, and machine-casting said alloy into grids.

16. The method of decreasing corrosion-susceptibility of the positive grid of a storage battery of the lead-acid type due to the presence in the lead alloy of antimony within the range of from about 4.5% to about 12.5% by weight, which comprises adding to said lead and said antimony, arsenic in amount from about 0.2% to about 2.5% by weight, as a corrosion-inhibiting additive whose effectiveness increases with increasing percentages thereof.

17. The method of decreasing corrosion-susceptibility of the positive grid of a storage battery of the lead-acid type due to the presence in the lead alloy of antimony within the range of about 4.5% to about 12.5% by weight, which comprises adding to said lead and said antimony, arsenic in amount from about 0.2% to about 2.5% by weight, as a corrosion-inhibiting additive whose effectiveness increases with increasing percentages thereof and which arsenic at percentages upwardly from about 0.45% more than offsets said corrosion-susceptibility.

18. A storage battery of the lead-acid type having positive and negative plates surrounded by electrolyte, characterized by machine-cast positive grids consisting essentially of a lead-arsenic-antimony alloy, said alloy including antimony about 6%, arsenic from about 0.45% to about 1.25%, and lead the remainder with tin in amount from about 0.15% to about 0.5%.

19. A cast type battery plate grid formed of a lead base alloy comprising antimony approximately 4.5% to 12.5%, arsenic in excess of 0.2% and as high as 2.5%, tin approximately 0.15% to 0.5%, and the remainder lead and impurities, characterized by being resistant to corrosion and disintegration in car battery service.

20. A cast type battery plate grid formed of a lead base alloy comprising antimony from about 4.5% to about 12.5%, arsenic in excess of 0.25% and extending to at least 2.5%, tin approximately 0.15% to 0.5%, and the remainder of lead and impurities, characterized by being resistant to corrosion and disintegration in car battery service.

References Cited in the file of this patent

UNITED STATES PATENTS

| Number | Name | Date |
|---|---|---|
| 480,266 | Knowles | Aug. 9, 1892 |
| 842,801 | Morrison | Jan. 29, 1907 |
| 1,722,358 | Seljesaeter | July 30, 1929 |
| 1,807,788 | Kemp | June 2, 1931 |
| 1,882,749 | Betterton | Oct. 18, 1932 |
| 2,148,741 | Gouser | Feb. 28, 1939 |
| 2,221,677 | Grimditch | Nov. 12, 1940 |
| 2,252,104 | Walde | Aug. 12, 1941 |
| 2,305,133 | Campbell | Dec. 15, 1942 |

FOREIGN PATENTS

| Number | Country | Date |
|---|---|---|
| 576,164 | Germany | May 8, 1933 |

OTHER REFERENCES

Vinal "Storage Batteries," 3rd ed. (1940), page 20.

"Metal Progress," Jan. 1943, pp. 56–59 and 96.